(12) United States Patent
Boegel et al.

(10) Patent No.: US 7,316,849 B2
(45) Date of Patent: Jan. 8, 2008

(54) SEMI-FINISHED PRODUCT MADE OUT OF A DUCTILE MATERIAL WITH BREAKING AREAS

(75) Inventors: Andreas Boegel, Weissenhorn (DE); Isabell Buresch, Illertissen (DE); Robert Kloeckler, Tiefenbach (DE); Heinz-Ulrich Koboecken, Hagen (DE); Eberhard Lepin, Illertissen (DE); Karl-Hermann Stahl, Voehringen (DE); Hans-Juergen Stoeckl, Voehringen (DE)

(73) Assignee: Wieland-Werke AG, Ulm (DE)

( * ) Notice: Subject to any disclaimer, the term of this patent is extended or adjusted under 35 U.S.C. 154(b) by 0 days.

(21) Appl. No.: 10/325,612

(22) Filed: Dec. 20, 2002

(65) Prior Publication Data

US 2003/0152738 A1 Aug. 14, 2003

(30) Foreign Application Priority Data

Dec. 21, 2001 (DE) .................... 101 63 038

(51) Int. Cl.
*B32B 3/30* (2006.01)
(52) U.S. Cl. .................. 428/571; 428/43
(58) Field of Classification Search ........ 428/43, 428/571, 572; 174/70 C; 225/2; 83/876
See application file for complete search history.

(56) References Cited

U.S. PATENT DOCUMENTS

| | | | |
|---|---|---|---|
| 2,053,375 A * | 9/1936 | Nicholas ............ | 225/3 |
| 3,162,907 A | 12/1964 | Maier et al. | |
| 3,416,347 A | 12/1968 | Walsh et al. | |
| 4,011,109 A | 3/1977 | Golland et al. | |
| 4,109,500 A | 8/1978 | Franek | |
| 4,525,594 A * | 6/1985 | Pschunder ............ | 136/256 |
| 5,133,492 A | 7/1992 | Wohrstein et al. | |
| 6,359,540 B1 * | 3/2002 | Spiller et al. ......... | 335/216 |

FOREIGN PATENT DOCUMENTS

| | | |
|---|---|---|
| DE | 1 508 800 | 5/1970 |
| DE | 1 815 380 | 7/1970 |
| DE | 33 14 830 A1 | 10/1984 |
| DE | 196 41 144 A1 | 4/1998 |
| EP | 491 574 A1 | 6/1992 |
| GB | 1 406 796 | 9/1975 |

OTHER PUBLICATIONS

Handbuch der Umformtechnik/Schuler GmbH Springer-Verlag Berlin Heidelberg New York, 1996, p. 286, Illustration 4.6.2 including English language translation thereof (3 sheets).

* cited by examiner

*Primary Examiner*—Alexander S. Thomas
(74) *Attorney, Agent, or Firm*—Flynn, Thiel, Boutell & Tanis, P.C.

(57) ABSTRACT

A band-shaped semi-finished product is made out of a ductile material and is configured to be separated into at least two sections. At least one pair of wedge-shaped, non-cuttingly formed longitudinal notches are formed, between the tips of which there remains a thin web of material, which can be torn easily with little force. The semi-finished product is distinguished by burr-free separated edges, defined geometry of the separating surfaces, and extremely reduced breaking-surface portions. It shows improved resistance during static and dynamic stress, in particular for alternating bending loads, in comparison to conventional, for example via the rolling-cutting technique, separated semi-finished products.

26 Claims, 4 Drawing Sheets

SEMI-FINISHED PRODUCT MADE OUT OF A DUCTILE MATERIAL WITH BREAKING AREAS

FIELD OF THE INVENTION

The invention relates to a semi-finished product made out of a ductile material, preferably metal and having regions of reduced thickness to facilitate separation thereat.

BACKGROUND OF THE INVENTION

Ductile materials are manufactured as a semi-finished product in large quantities and large sizes, namely metallic materials. During the course of manufacture the need arises to achieve the required geometries by separating the preforms manufactured in multiple width or multiple length. Thus, for example, band-like semi-finished products are fabricated to the width and/or length required for the respective use through lengthwise and crosswise separation. In large scale production, cutting methods designed according to the roll-cutting principle are mostly used for this.

Sheet-metal band wound to a coil is thereby mostly separated into several narrow bands or strips of bands by longitudinal separating systems. The separation is done by a waste-free cutting with circular, rotating knives. Circular-knife scissors with a continuous operating shaft are equipped with circular knives, ring-like rollers and spacer sleeves. The method according to the state of the art is illustrated in FIG. 1.

[Source: Handbuch der Umformtechnik/Schuler GmbH Springer-Verlag Berlin Heidelberg New York, 1996, Page 286, Illustration 4.6.2]

A circular-knife scissors typical for the non-cutting longitudinal separation according to the roll-cutting principle thus consists essentially of symmetrical rotating knives which are fastened on an upper and on a lower cutter bar at a distance adapted to the thickness of the material to be separated, or, however, are clamped axially on knife driving shafts above and below the band. The knives are axially adjusted to one another to a specific cutting space and vertically to a tool immersion depth. These values are determined by the nature of the material itself, its thickness and by the desired shaping of the cutting edge.

The arched cutting edge of an upper knife rolls on and then off the edge during cutting against the cutting edge of a lower knife. A portion of the material is sheared by the cooperating knives, the remaining material thickness breaks to complete separation.

This breaking portion is for many materials, depending on thickness, hardness and nature, approximately 20%-40% of the band thickness. The breaking zone naturally develops a heavily roughened forced breaking surface. Its design is determined by the essentially freely occurring process of breaking. Shape and dimension of the breaking zone therefore differ clearly from the shearing zone formed by the direct action of the tools, and the breaking zone ends automatically at the original surface in a cutting burr (FIG. 2).

The cutting burr is a highly hardened, sharp-edged material which extends beyond the contours of the ideally separated material. Shape and size of the burr are again strongly influenced by method parameters.

Burrs are undesired in every respect. They pose risks for injury in case of manual handling. During further processing burrs can increasingly create undesired wear and flitter or can cause damage to surrounding material through the cutting action of the burr. The burr, which always lies on an outer edge of the material is, during use, fundamentally a weak point. The tear formation often begins here in cases of dynamic and static loads. In the case of high demands on the alternating bending strength of especially narrow material strips there exist particularly high demands on the cutting quality. An unfavorable shape of the band edges in the shearing zone area, the rough breaking zone and the cutting burr particularly significantly influence the alternating bending strength. Therefore great efforts are directed to minimizing the burr formation and the low-cost finishing of separate, burr-containing bands is of great interest.

The undefined shape of the broken portion of the separating surface is a further deficiency of the otherwise so economical rolling knife technique. Therefore for various uses instead of the low-cost separated band-shaped semi-finished products there exists the demand for bands expensively finished by finish rolling of the edges. As an alternative press/pull products in wire form are also utilized, which right from the start have defined geometries in the entire cross section.

SUMMARY OF THE INVENTION

The basic purpose of the present invention is therefore to overcome the disadvantages of separating via the roller-cutting technique according to the state of the art without thereby causing high expenses or lower productivity. In particular, the following individual purposes are to be attained:

Manufacture of a defined position of the breaking zone,
a avoiding the formation of burrs,
reducing the wear and flitter formation,
drastic reduction of the breaking portion,
avoiding the mechanical weak point of the separated goods, which weak point is caused by the breaking portion and outside position of the burr.

This purpose is attained inventively by making the semi-finished product out of a ductile material, in particular metal, having on oppositely lying sides of the semi-finished product at least one pair of aligned wedge-shaped notches, and by having a web of material between the tips of the wedge-shaped notches, the thickness d of which web of material is so thin in comparison to the thickness D of the semi-finished product that it can be separated thereat using little force and without a cutting deformation through an oppositely directed deflection or bending out of the plane of the semi-finished product areas defined by the notch pair.

The ductile materials can be cooper-base materials, aluminum-base materials, iron-base materials, zinc-base materials, or composites of any one of the materials. The ductile material can also comprise plastic, ceramics or material composites thereto.

The notches are in particular non-cuttingly formed. The semi-finished product is preferably a band-shaped material. The invention, however, can, for example, also be used for wires or profiled wires. In the case of coated bands with, for example, a tin-plated, silver-plated or nickel-plated surface, there results at the same time the advantage that the coating of the notched flanks is essentially maintained. In some embodiments, the flanks have arch-shaped, wavy, or stepped cross sections, or in some instances a combination of the cross sections.

Based on the operation of the circular-knife scissors, the invention spacially uncouples the shearing and the breaking.

It is suggested to provide semi-finished product made out of ductile materials which is to be separated, through plastic, nonchip-creating forming along an axis that is perpendicular with respect to the later separating line and is perpendicular at the same time to the surface of the semi-finished product, advantageously on both sides and symmetrically by wedge-shaped notches so that a very thin web of the material to be separated remains between the tips of the two notches, which are as exactly as possible directly opposite to one another.

Rotation-symmetrical tools in machine-building arrangements are utilized as they are known from the common circular-knife scissors. For example, rolling disks with suitable profiles are utilized as the tool for forming the wedge-shaped longitudinal notches. A typical geometry of the wedge profile has a wedge angle of 10°-80°. The axial and vertical offset of the disk wedge tips is to be kept at a minimum so that the smallest existing tolerance realizable informations for the common tools of the precision cutting can be applied.

The thickness of the remaining web of material is in the case of a band-shaped semi-finished product below 0.5 mm thickness, preferably 5% to 40% of the material thickness of the material to be separated. The material flow in length and width of the semi-finished product, which material flow is caused by the removal of the material from the notches, can result in changes of the cross-sectional contour of the semi-finished product to be separated so that, depending on the situation, advantageously a bound cold shaping of the surfaces affected in the exactness of their shape is to follow.

This cold shaping can be purposefully utilized in order to achieve in at least one shaping step at the place of the notch pair an almost squared off edge guide.

In addition, this cold shaping makes it possible in the cases of the thinnest bands with D≦0.2 mm and foils, where a defined notching is, based on the question of tolerance, difficult or not reliably possible, to start out from a pre-manufactured band, the notches of which are indeed-almost rolled shut in several steps, however, its breaking area is maintained.

The semi-finished product prepared in this manner is separated with little force and with any desired speed in a further step by deflecting or bending out of the plane of the semi-finished product areas relative to one another, which areas are defined by the notches.

The separated semi-finished product sections have according to the inventive method defined constructed outer edges. The broken surface lies always completely within the surface of the separating surface without extending beyond the original material surface. The expansion of the breaking surface corresponds with or corresponds approximately with the thickness of the web formed by the respectively two oppositely lying notches. It is thus smaller by a multiple than in the case of the common cutting with rolling knives. A burr is not created during separation of the web when a sufficient directly opposite aligned orientation of the notches exists.

BRIEF DESCRIPTION OF THE DRAWINGS

In comparison to the state of the art according to FIGS. 1 and 2, the invention will be discussed in connection with the exemplary embodiment according to FIGS. 3 to 5. In the drawings.

DETAILED DESCRIPTION

Figure 1:
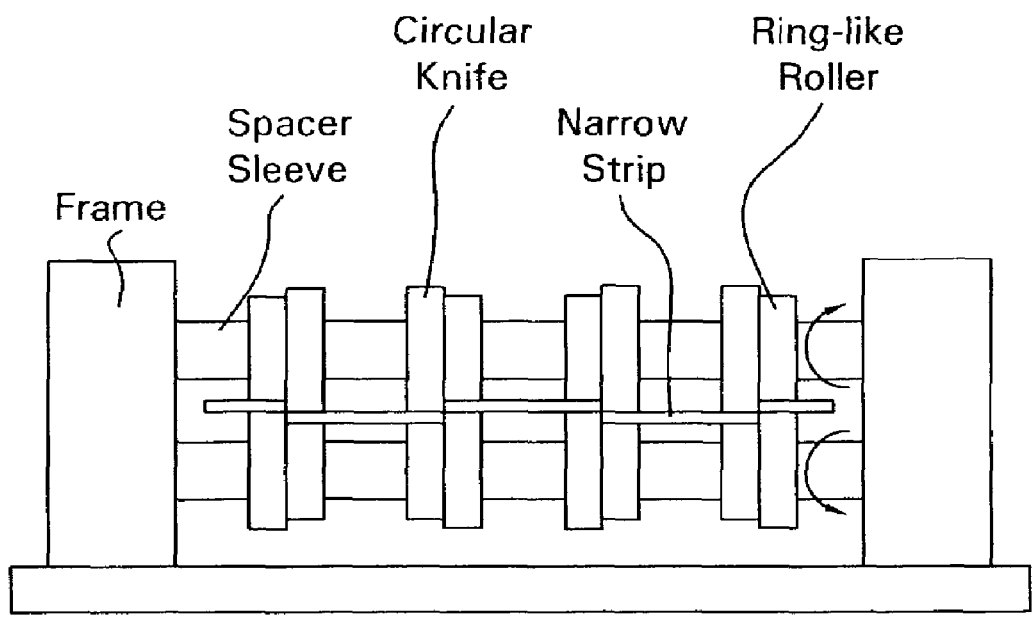
FIG. 1 illustrates a longitudinal separation of a band-shaped semi-finished product according to the state of the art.
Figure 2:
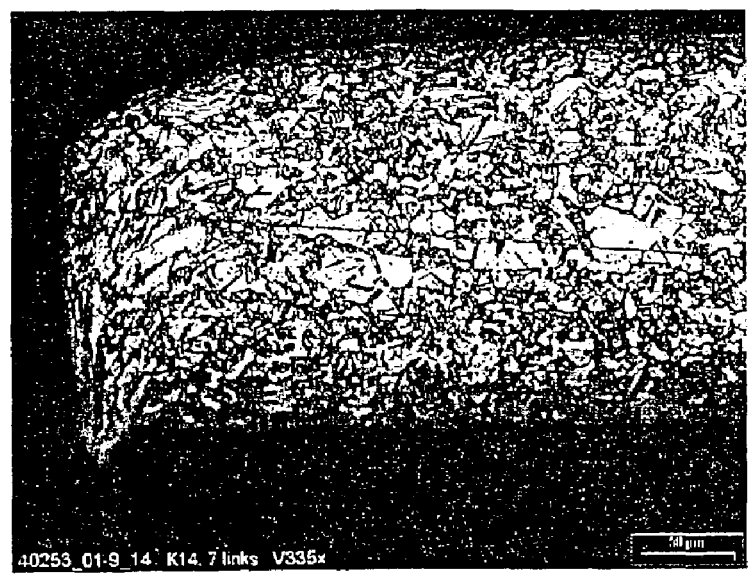
FIG. 2 illustrates the burr formation according to the state of the art.
Figure 3:
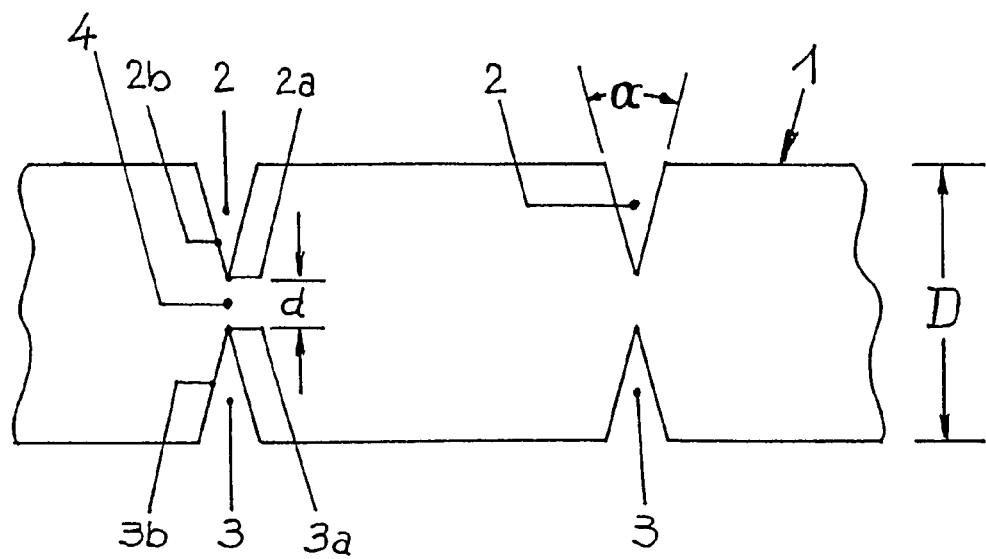
FIG. 3 schematically illustrates a band-shaped semi-finished product with inventive longitudinal notches.
Figure 4:
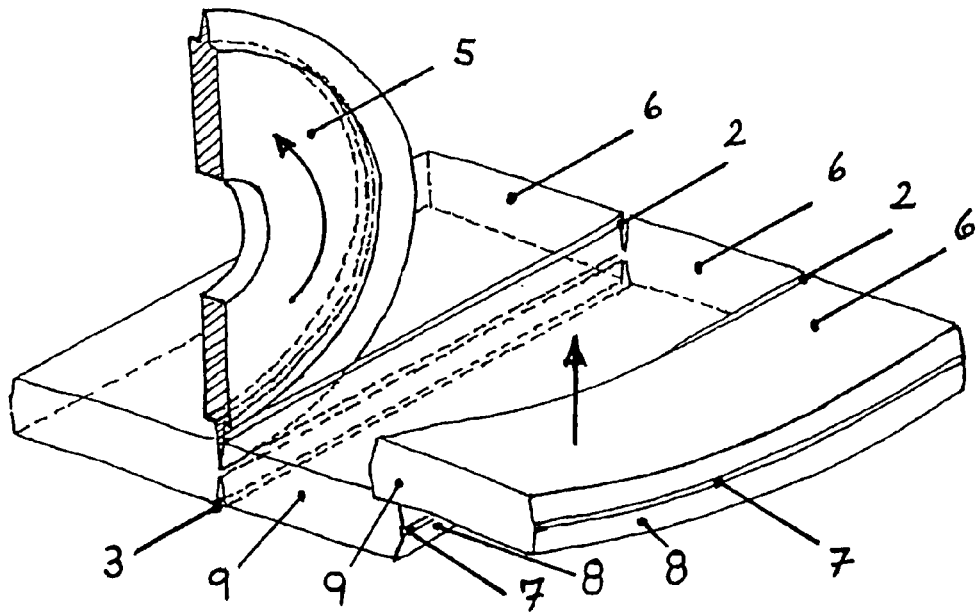
FIG. 4 schematically illustrates the manufacture of the inventive semi-finished product and the separation of a semi-finished product section therefrom.

The band-shaped semi-finished product 1 of the thickness D according to FIGS. 3 and 4 has opposing pairs of wedge-shaped longitudinal notches 2, 3. The notches 2 and 3 have tips 2$a$ and 3$a$, and flanks 2$b$ and 3$b$, between which the wedge angle α is formed. A thin web of material 4 of the thickness d extends between the tips 2$a$, 3$a$, which are preferably arranged with little or no offset. The band-shaped semi-finished product is solid at the cross-sectional slices 8 shown in FIG. 4 both along the small broken surfaces 7 and the crosssectional slices 9 or faces of the surface transverse thereto.

The notches 2, 3 are formed according to FIG. 4 by means of an upper and lower notching disk 5 (only one upper one is here illustrated). The material lying between the notches 2, 3 is hardened by the opposite sided forming operation. The web of material 4 is thin and has an increased specific strength, however, the broken elongation of the material is significantly reduced in the narrowly localized area of the web 4. The separating ability is thus prepared and requires only little force to effect. By deflecting or bending the areas adjacent to the notches 2, 3 with the necessary forces in direction of the arrow illustrated in FIG. 4, a semi-finished product section 6 is separated.

As indicated, the semi-finished product section 6 has (on both sides) only a small broken surface 7.

Figure 5:
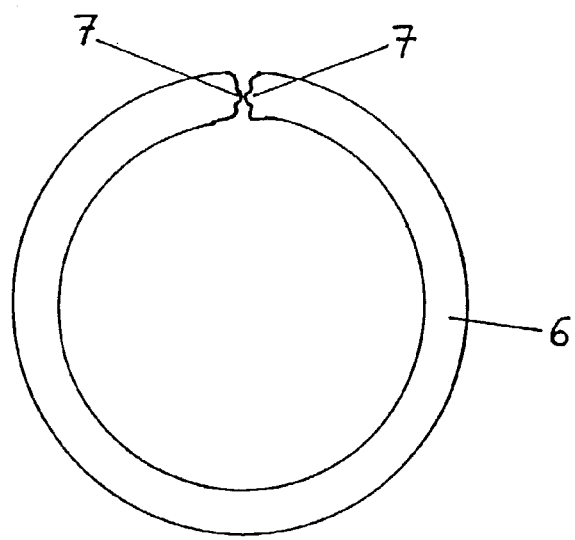
FIG. 5 schematically illustrates a semi-finished product section, which has been formed into an open seam tube, prior to being welded into a tube with a longitudinal seam.
Figure 6:
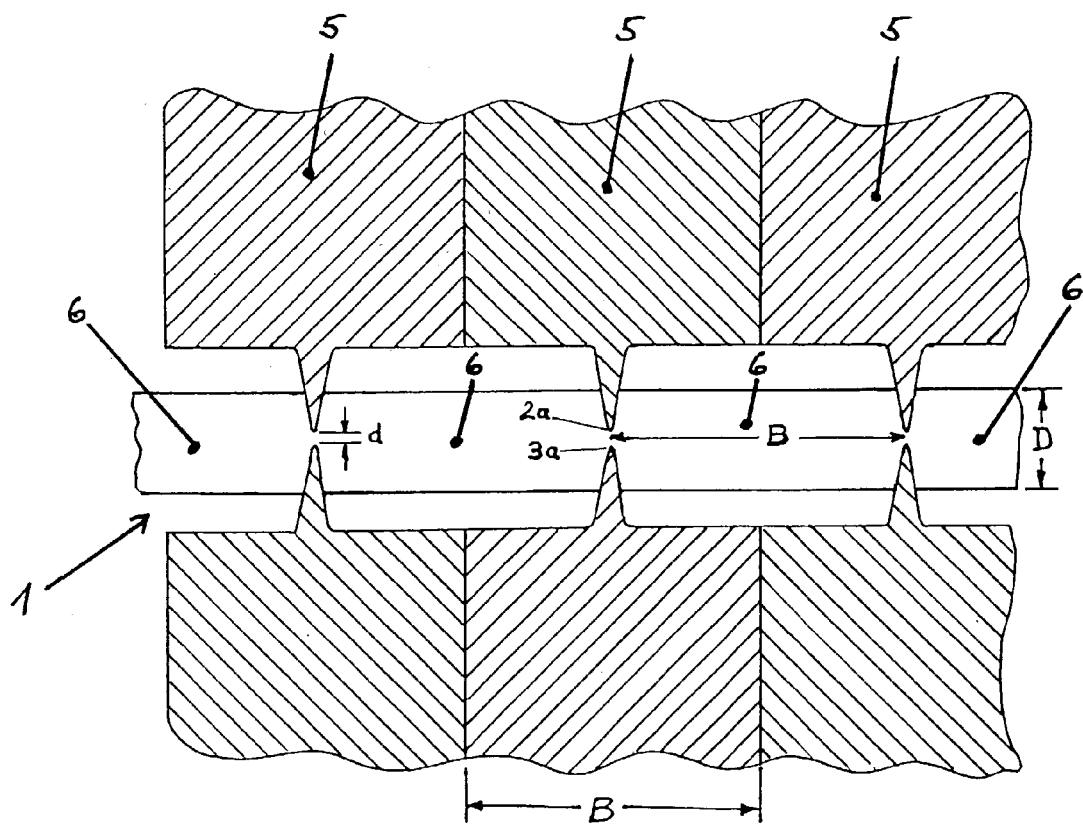
FIG. 6 schematically illustrates the manufacture of the inventive semi-finished product in connection with a numerical example.
Figure 7A:
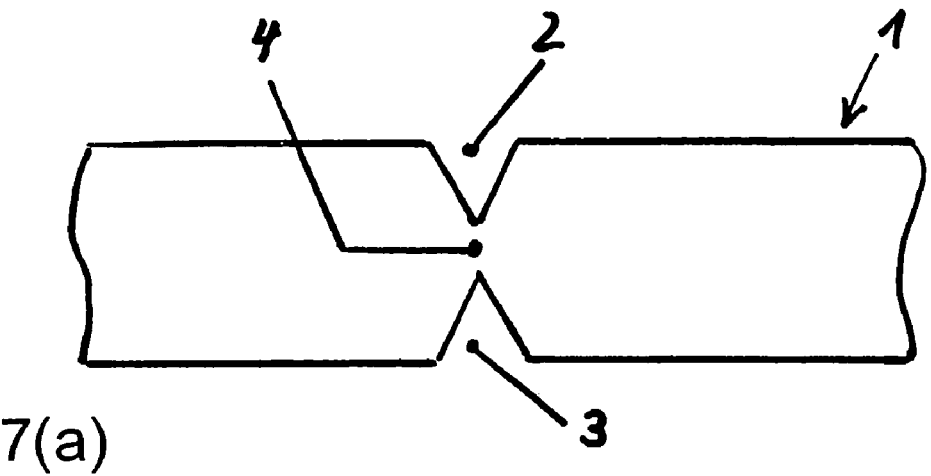
FIGS. 7(a)-7(d) schematically illustrate the influence of rolling steps on the construction of a pair of notches while forming the breaking area.
Figure 7B:
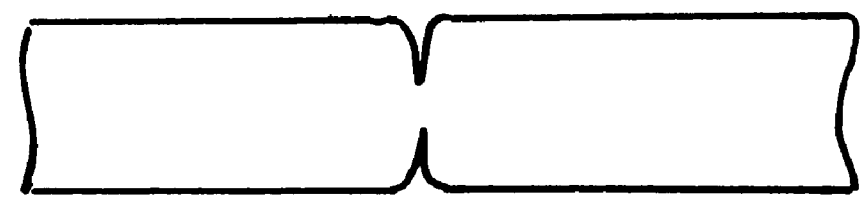
Figure 7C:
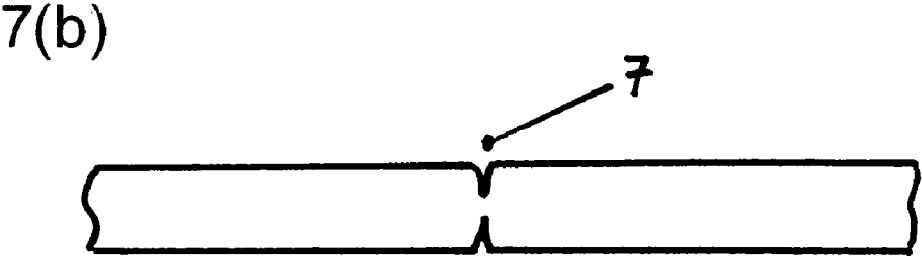
Figure 7D:
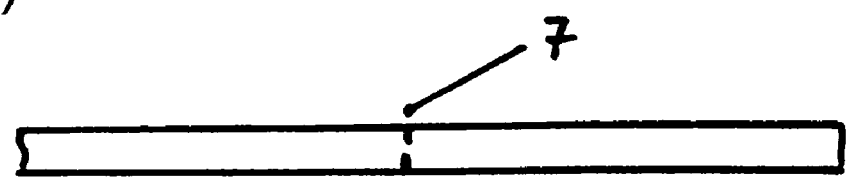

This can also be seen in FIG. 5 where such a semi-finished product section 6 is formed into an open seam tube in order to be longitudinally welded into a tube. As is well known, seam tubes are formed as solid-walled members. Thus the band-shaped semi-finished product sections 6 are solid.

NUMERICAL EXAMPLE

A band of a thickness D=0.20 mm of, a soft-annealed SE-Cu 58 (ductile material) was separated into B=6 mm wide strips (sections) 6 by oppositely aligned wedge-shaped circular-knife tips each penetrating 0.080 mm into the band. The width of the circular-knife disks 5 axially fixed to an upper and lower operating shaft was thereby equal to the band-strip width B—with the sharpened circular-knife tip in half the disk thickness B/2. The wedge angle of the notch profile is α=20°. After fixing the several circular knives 5 on the (two) operating shafts, they were adjusted in the framework with respect to alignment and truth of rotation of the knife tips 2$a$ and 3$a$. This adjusting operation caused a slight radiusing of the wedge-shaped tips 2$a$, 3$a$ to a disk-tip radius ≦5 μm.

Symmetrically longitudinally notched band strips 6 were created in this manner with the adjusted (wedge) circular-knife system and with the application of a back pull aligned with the band-strip cross section. The web thickness d was d=30 to 50 μm, the average thus 40 μm corresponding to 20% of the band thickness D.

The coil treated in this manner was moved to the reel of a further processing machine. The individual sections 6 with a width of 6 mm were then separated manually from the coil at the coil one after the other to a length of approximately 1 m by tearing off with a slight pull in each case the outermost section 6 through deflection out of the plane of the band. Later examined samples showed that an approximately centrally extending breaking zone having in cross section an approximate 40±10 μm thickness. Burr formation could not be found neither in the cut nor by feeling the breaking zone. The cross sections of the separated individual sections 6 did not show within the scope of the necessary tolerance any impermissible, remaining plastic deformation of the band cross section by the forces applied during the separation. The separated individual sections 6 were in this manner fed into the further processing machine, and were pulled in together with little tension, steadily accelerating for the further processing over guide rollers, which caused the necessary oppositely directed deflection of the individual sections 6 against one another for effecting a continuing tearing of the material.

FIGS. 7(*a*)-7(*d*) finally show-starting out from a band-shaped semi-finished product 1 with wedge-shaped notches 2, 3 and remaining web 4 according to FIG. 7(*a*) (compare FIG. 3)—the influence of, for example, three rolling steps on the construction of the notch pair 2, 3.

Already after the first rolling step (FIG. 7(*b*)), an approximately squared off edge guide is achieved at the place of the notches 2, 3.

The original notches 2, 3 are indeed almost rolled shut after two further rolling steps (FIGS. 7 (*c*), 7(*d*)), however, a breaking area 7 remains at the place of the notches 2, 3.

The band-shaped semi-finished product has a thickness in a range of 10 μm to 0.3 mm and a width in a range of 0.5 mm to 25 mm.

A band-shaped semi-finished product can be used to form flat-band cable for the transmission of electric signals or for the transmission of electric energy. The semi-finished product can also be used to form electromechanical building components, such as connectors, relays, contact springs or the like. The semi-finished product can also be used to form building industry products, for roofing or covers for facades. Finally, the semi-finished material can be used to form welded structures, in particular tubes.

What is claimed is:

1. A band-shaped semi-finished product comprising a ductile material including copper-base materials or material composites thereto,
   having a maximum thickness of 0.5 mm wherein on oppositely lying sides of the semi-finished product at least one pair of oppositely aligned wedge-shaped notches is provided, and wherein between tips of the wedge-shaped notches there exists a single web of material, the thickness of which is 5% to 40% of the thickness of the semi-finished product, so that the web between the wedge-shaped notches is capable of being manually torn off using little force and without a cutting deformation through an oppositely directed deflection of the semi-finished product areas defined by the notch pair,
   wherein a cross-section sliced through the band-shaped semi-finished product transverse to the notches is solid, and
   wherein said band-shaped semi-finished product includes a coating comprising one of a tin-plated, silver-plated or nickel-plated coating that coats the surface of the semi-finished product including the notches thereof.

2. The band-shaped semi-finished product according to claim 1, wherein the web of material lies centrally in the expansion of the semi-finished product, which expansion is defined by the notch pair.

3. The band-shaped semi-finished product according to claim 1, wherein the web of material lies off-center in the expansion of the semi-finished product, which expansion is defined by the notch pair.

4. The band-shaped semi-finished product according to claim 1, wherein the web of material occupies an edge position in the expansion of the semi-finished product, which expansion is defined by the notch pair.

5. The band-shaped semi-finished product according to claim 1, wherein the web thickness is from 0.01 mm to 0.1 mm.

6. The band-shaped semi-finished product according to claim 1, wherein only a small offset of the tips of the notches exists.

7. The band-shaped semi-finished product according to claim 1, wherein a wedge angle for the wedgeshaped notches is β=0° to 120°.

8. The band-shaped semi-finished product according to claim 7, wherein the wedge angle for the wedge-shaped notches is β=10° to 80°.

9. A method of making the semi-finished product according to claim 1, wherein defined breaking surfaces are formed, and wherein the expansion of the breaking surfaces corresponds approximately with the thickness of the web of material.

10. The method according to claim 9, wherein the thickness of the bandshaped semi-finished product is in a range of 10 μm to 300 μm and a width of the band-shaped semi-finished product is in a range of 0.5 mm to 25 mm.

11. The method according to claim 9, wherein flat-band cable for the transmission of electric signals or for the transmission of electric energy is formed.

12. The method according to claim 9, wherein electromechanical building components, including connectors, relays, or contact springs are formed.

13. The method according to claim 9, wherein building industry products are formed.

14. The band-shaped semi-finished product according to claim 1, wherein said band-shaped semi-finished product comprises a manually bendable and tearable semi-finished band-shaped product.

15. The band-shaped semi-finished product according to claim 1, wherein said notches comprise non-cuttingly formed notches so that flanks of said notches include said coating.

16. The bandshaped semi-finished product according to claim 1, wherein said band-shaped semi-finished product comprises a solid band-shaped semi-finished product.

17. A band-shaped semi-finished product comprising a ductile material including copper-base materials or material composites thereto, said bandshaped semi-finished product having a maximum thickness of 0.5 mm, pairs of oppositely aligned notches on oppositely lying sides of the semi-finished product, wherein adjacent pairs of said oppositely aligned notches define product sections therebetween, wherein between tips of each said pair of oppositely aligned notches there exists a web of material, the thickness of which is from 5% to 40% of the thickness of the semi-finished product, wherein said band-shaped semi-finished product includes a coating comprising one of a tin-plated, silver-plated or nickel-plated coating that coats the surface of the semi-finished product including the notches thereof, wherein each said web between the tips of the opposing notches is capable of being manually torn off using little force and without a cutting deformation through a deflection of one of said product sections out of a plane defined by the semi-finished product, the manual tearing of the web between the notches resulting in the product sections having no burrs in a breaking zone whereat the web separates.

18. The band-shaped semi-finished product according to claim 17, wherein a cross-section sliced through the band-shaped semi-finished product transverse to the notches is solid, and
wherein the manual tearing of the web by the little force comprises a slight pull causing the deflection of an outermost one of the product sections out of the plane of the semi-finished product.

19. The band-shaped semi-finished product according to claim 17, wherein the faces of the semi-finished product including the product sections thereof are solid.

20. The band-shaped semi-finished product according to claim 17, wherein the semi-finished product forms a solid-walled tube.

21. A band-shaped semi-finished product comprising a ductile material including copperbase materials or material composites thereto,
wherein on oppositely lying sides of the semi-finished product at least one pair of oppositely aligned notches is provided, and wherein between tips of the notches there exists a web of material,
wherein said band-shaped semi-finished product includes a coating comprising one of a tin-plated, silverplated or nickel-plated coating that coats the surface of the semi-finished product including the notches thereof,
wherein the semi-finished product between the notches is capable of being manually torn off using little force and without a cutting deformation through an oppositely directed deflection of the semi-finished product areas defined by the pair of notches, and
wherein a cross-section sliced through the band-shaped semi-finished product transverse to the notches is solid.

22. The band-shaped semi-finished product according to claim 21, wherein the semi-finished product has a maximum thickness of 0.5 mm.

23. The band-shaped semi-finished product according to claim 22, wherein said band-shaped semi-finished product comprises a solid band-shaped semi-finished product and the thickness of the web of material is 5% to 40% of the thickness of the semifinished product.

24. The band-shaped semi-finished product according to claim 23, wherein the notches comprise wedge-shaped notches.

25. The method according to claim 21, wherein the thickness of the bandshaped semifinished product is in a range of 10 μm to 300 μm and a width of the band-shaped semi-finished product is in a range of 0.5 mm to 25 mm.

26. The band-shaped semi-finished product according to claim 21, wherein a small offset of the tips of the notches exists.

* * * * *

UNITED STATES PATENT AND TRADEMARK OFFICE
CERTIFICATE OF CORRECTION

PATENT NO. : 7,316,849 B2　　　　　　　　　　　　　　　　　　　　　　Page 1 of 1
APPLICATION NO. : 10/325612
DATED : January 8, 2008
INVENTOR(S) : Andreas Boegel et al.

It is certified that error appears in the above-identified patent and that said Letters Patent is hereby corrected as shown below:

Column 6,　　line 24; change "wedgeshaped" to --wedge-shaped--.

line 25; change "β=0°" to --α=0°--.

line 28; change "β=0°" to --α=0°--.

line 35; change "bandshaped" to --band-shaped--.

line 54; change "bandshaped" to --band-shaped--.

line 59; change "bandshaped" to --band-shaped--.

Column 7,　　line 28; change "copperbase" to --copper-base--.

Column 8,　　line 2; change "silverplated" to --silver-plated--.

line 20; change "semifinished" to --semi-finished--.

line 26; change "bandshaped semifinished" to
　　　　　　　　　　　　--band-shaped semi-finished--.

Signed and Sealed this

First Day of July, 2008

JON W. DUDAS
*Director of the United States Patent and Trademark Office*